(12) United States Patent
Kim et al.

(10) Patent No.: US 10,643,758 B2
(45) Date of Patent: May 5, 2020

(54) TREATMENT METHOD FOR VOLUME REDUCTION OF SPENT URANIUM CATALYST

(71) Applicant: Korea Atomic Energy Research Institute, Daejeon (KR)

(72) Inventors: Kwang-Wook Kim, Daejeon (KR); Keun-Young Lee, Sejong-si (KR); Byung-Gil Ahn, Daejeon (KR); Dong Yong Chung, Daejeon (KR); Bum Kyoung Seo, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 103 days.

(21) Appl. No.: 15/960,166

(22) Filed: Apr. 23, 2018

(65) Prior Publication Data

US 2019/0019590 A1    Jan. 17, 2019

(30) Foreign Application Priority Data

Jul. 14, 2017    (KR) .......................... 10-2017-0089622

(51) Int. Cl.
*G21F 9/12*    (2006.01)
*C22B 60/02*    (2006.01)
*G21F 9/30*    (2006.01)

(52) U.S. Cl.
CPC ............ *G21F 9/12* (2013.01); *C22B 60/0234* (2013.01); *C22B 60/0247* (2013.01); *C22B 60/0278* (2013.01); *G21F 9/305* (2013.01)

(58) Field of Classification Search
CPC ....... G21F 9/12; G21F 9/305; C22B 60/0234; C22B 60/0247
USPC ............................................................ 588/2
See application file for complete search history.

(56) References Cited

U.S. PATENT DOCUMENTS 9,181,605 B2 *    11/2015    Kim .................... C22B 60/0278

FOREIGN PATENT DOCUMENTS

| JP | 62-191094 | 8/1987 |
| KR | 10-2007-0111891 | 5/2009 |
| KR | 10-1316925 | 10/2013 |

OTHER PUBLICATIONS

Korea Office Action, dated Dec. 27, 2018, in Korean Patent Application No. 10-2017-0089622, a related application, 6 ppl. (in Korean language).

* cited by examiner

*Primary Examiner* — Edward M Johnson
(74) *Attorney, Agent, or Firm* — Leydig, Voit & Mayer, Ltd.

(57) ABSTRACT

A volume reduction treatment method able to reduce the volume of the final disposal waste of a spent uranium catalyst. As a result, the disposal cost of the spent uranium catalyst is able to be reduced and the utilization of waste repositories are able to be improved.

21 Claims, 7 Drawing Sheets

<Using a laboratory scale filter press>

(The slurry formed when a filtration aid was not used)

(The cake formed when a filtration aid was used)

<Using a bench scale filter press>

(The slurry formed when a filtration aid was not used)

(The cake formed when a filtration aid was used)

TREATMENT METHOD FOR VOLUME REDUCTION OF SPENT URANIUM CATALYST

CROSS-REFERENCE TO RELATED APPLICATIONS

This application is a U.S. Nonprovisional Application filed under 35 U.S.C. § 111(a) which claims the benefit of KR Application No. 10-2017-0089622, filed Jul. 14, 2017. This application is hereby incorporated by reference in its entirety.

BACKGROUND OF THE INVENTION

Field of the Invention

The present invention relates to a treatment method for volume reduction of a spent uranium catalyst.

Description of the Related Art

Since 1990s in Korea, the mixed $U_wSb_xFe_aAl_bMo_cV_dO_z/SiO_2$ catalyst prepared by mixing iron (Fe), aluminum (Al), molybdenum (Mo), vanadium (V) and bismuth (Bi), in addition to uranium (U) and antimony (Sb), with the porous silica support ($SiO_2$) has been used in order to produce acrylonitrile ($CH_2=CHCN$), the synthetic fiber raw material, for about 10 years. As a result, approximately 7,100 drums of the spent uranium catalyst waste have been generated. These waste materials should be transferred to domestic repositories as soon as possible.

The uranium used in the spent uranium catalyst is depleted uranium (uranium-234; 0.001%, uranium-235; 0.194%, uranium-238; 99.805%), and the amount is 4-9 wt %. The spent uranium catalyst also includes antimony at the concentration of 15-25 wt % and iron at the concentration of about 5 wt %. The catalyst support silica includes Si at the concentration of 50-60 wt %.

According to Notification No. 2015-003 of Nuclear Safety Commission of Korea, The disposal requirement for uranium-bearing waste to a low-intermediate level radioactive waste repository operating in Korea is that "total radioactivity of alpha-emitting waste such as uranium waste should be less than 3,700 Bq/g. The activity is equivalent to 15.3% of natural uranium activity and to 25.2% of the activity of depleted uranium with 0.194 wt of U-235. The clearance activity concentration of uranium waste is derived on the basis of evaluation of dose assessment scebarios meeting two conditions of individual dose criterion of less 10 μSv/yr, and of group dose creiterion of less than 1 man•Sv. The release limit for natural radionuclides proposed by International Atomic Energy Agency (IAEA RS G-1.7) is up to 1 Bq/g. This indicates that the content of depleted uranium used in the uranium catalyst to meet the activity concentration is equivalent to less than about 0.007 wt % in the solid waste.

From the point of radioactivity of the uranium catalyst used in Korea, the radioactivity meets the acceptance criteria of the radioactive waste repository operated in Gyeongju area. Currently, the disposal cost is around KRW 15 million per 200 L drum, but it is expected that it will reach KRW 20 million per drum due to the increase of treatment costs and additional costs in the future. If the conventional cementation for solidification is performed for the direct treatment of the powdered spent uranium catalyst, the volume of the final wastes is predicted to be at least 10,000 to 20,000 drums. As explained above, the disposal cost of the low-level waste disposal site constructed in Korea is very expensive and it is constructed for the disposal of mainly nuclear power plant wastes, indicating that more effective and efficient method has to be executed in the course of treating the spent uranium catalyst generated in private sector in order to increase the usability of the waste disposal site and to minimize the secondary waste production, considering the economic efficiency of the treatment. It is very difficult to completely separate uranium components from the spent uranium catalyst. Also, the separated uranium is depleted uranium so that it is not economically efficient. Besides, the concentration of all alpha nuclides in the separated high-purity uranium waste is higher, which is about 14,600 Bq/g, than the limit for the disposal of all alpha nuclide wastes in domestic low-level waste repositories, which is 3,700 Bq/g. Thus, the waste is not accepted in the repositories.

Therefore, if the silicon component in the support, which occupies most of the volume of the spent uranium catalyst, can be selectively dissolved and discharged after being purified to meet the clearance criteria, and thus if the remaining insoluble ingredients and uranium can be treated as mixed to meet the disposal limit of radioactivity for the waste repositories and if the wastewater also generated in the course can meet the discharge criteria, the disposal volume of the spent uranium catalyst can be minimized. Such idea of the spent uranium catalyst treatment method above can make an important progress to increase waste treatment efficiency and disposal site usability.

Korean Patent No. 10-1316925 (Patent Reference 1) is a domestic patent having such technical background. However, according to the Patent Reference 1 above, the spent uranium catalyst is repeatedly dissolved in an acid and alkali solutions, so that the device and the procedure are complicated due to the solid-liquid separation of the insoluble materials during that and due to the repeated transfer of the solid material to the acid and alkali dissolution tanks. Also a large amount of wastewater to be treated in a subsequent process is generated due to the use of a large amount of acid and alkali solutions. Besides, the additional steps of precipitating the remaining uranium in the generated waste liquid to be uranium peroxide ($UO_4$) and eliminating uranium using an adsorbent to remove trace uranium remaining in the solution are required, which make the whole process complicated and produce more waste liquid, indicating the volume of waste liquid to be treated is increased. The uranium remained in the solution generated after the dissolution and precipitation of silicon dioxide is to be precipitated as uranium peroxide. Its concentration greatly affects the rate of uranium peroxide precipitation and the size of uranium peroxide particles formed. The previous art including the one described in the Patent Reference 1 above does not include an effective uranium concentration control technique for increasing the uranium peroxide precipitation rate, indicating there is still an issue of retarded speed of volume reduction treatment of the entire spent uranium catalyst due to the decrease of the uranium peroxide precipitation rate.

Accordingly, in the course of a study of a volume reduction method of a spent uranium catalyst, the present inventors confirmed that the method of the present invention is simpler than the conventional method for treating the spent uranium catalyst and can minimize the production of waste liquid. The present inventors further proposed a more efficient volume reduction process of a spent uranium catalyst and a method of immobilizing the final solid materials generated in the process, leading to the completion of a highly efficient volume reduction method of the waste to be disposed.

SUMMARY OF THE INVENTION

It is an object of the present invention to provide an effective treatment method of a spent uranium catalyst in order to reduce the volume of the spent uranium catalyst to be disposed.

To achieve the above object, the present invention provides a treatment method of a spent uranium catalyst comprising the following steps:
selectively dissolving the support component by immersing the spent uranium catalyst in an alkali solution (step 1);
separating the dissolution solution and the undissolved solid materials in the step 1 by solid-liquid separation (step 2);
selectively precipitating the silicon ions included in the dissolution solution as silicon dioxide (step 3);
separating the silicon dioxide generated in step 3 by solid-liquid separation and its purification (step 4);
precipitating uranium ions as uranium phosphate by adding phosphate to the residual solution separated in the step 4 (step 5);
separating the uranium phosphate generated in step 5 by solid-liquid separation (step 6);
mixing the undissolved solid materials separated in step 2 with the precipitate of uranium phosphate separated in step 6 and then adding a glassification agent thereto, followed by heat-treatment to fix the mixture in the form of a glass-ceramic composite medium (step 7).

Herein, the solid-liquid separation in step 2 can be performed by using a separation membrane coated with diatomite powder.

ADVANTAGEOUS EFFECTS

In the treatment method of a spent uranium catalyst of the present invention, the undissolved solid materials and the uranium phosphate precipitate are mixed, and a glassification agent is added thereto, followed by heat-treatment to immobilize the mixture in the form of a glass-ceramic composite medium. Therefore, the volume of waste proceeding to the disposal site is significantly reduced and the leaching characteristics of the immobilized waste is remarkably improved as well.

The method of the present invention also uses the filtration method which is characterized by using a separation membrane coated with diatomite powder as a filter-aid for soil-liquid separation of slurry generated after dissolving the spent uranium catalyst in an alkali solution, indicating that the separation efficiency is greatly improved, compared with the conventional method, and the separation membrane can be effectively re-used as well.

BRIEF DESCRIPTION OF THE DRAWINGS

The application of the preferred embodiments of the present invention is best understood with reference to the accompanying drawings, wherein.

DETAILED DESCRIPTION OF THE INVENTION

Hereinafter, the present invention is described in detail.

The present invention provides a treatment method of a spent uranium catalyst comprising the following steps:
selectively dissolving the support component by immersing the spent uranium catalyst in an alkali solution (step 1);
separating the dissolution solution of step 1 and the undissolved solid materials by solid-liquid separation (step 2);
selectively precipitating the silicon ions included in the dissolution solution as silicon dioxide (step 3);
separating the silicon dioxide generated in step 3 by solid-liquid separation and its purification (step 4);
precipitating uranium ions as uranium phosphate by adding phosphate to the residual solution separated in the step 4 (step 5);
separating the uranium phosphate generated in step 5 by solid-liquid separation (step 6);
mixing the undissolved solid materials separated in step 2 with the precipitate of uranium phosphate separated in step 6 and then adding a glassification agent thereto, followed by heat-treatment to fix the mixture in the form of a glass-ceramic composite medium (step 7).

Herein, the solid-liquid separation in step 2 can be performed by using a separation membrane coated with diatomite powder.

In performing the treatment method of a spent uranium catalyst of the present invention, it is possible to secure a remarkable effect of stabilizing the disposal target solid generated in the uranium volume reduction process and significantly reducing the final disposal volume.

In the treatment method of a spent uranium catalyst of the present invention, the silicon support component which occupies most of the volume of the spent uranium catalyst can be separated selectively; the concentration of uranium included therein can be reduced at the clearance level of itself, more specifically less than 1 Bq/g, to enable release to environment; the concentration of uranium included in the waste liquid generated in the course of the process can be reduced enough to be discharged (less than about 1 ppm); and the particulate wastes separated lastly can be controlled to meet the acceptance criteria of the disposal site (radioactive concentration of less than 3,700 Bq/g, immobilization of dispersed particles, etc.). Therefore, the volume reduction rate of the spent uranium catalyst can be satisfactorily excellent.

Figure 1:
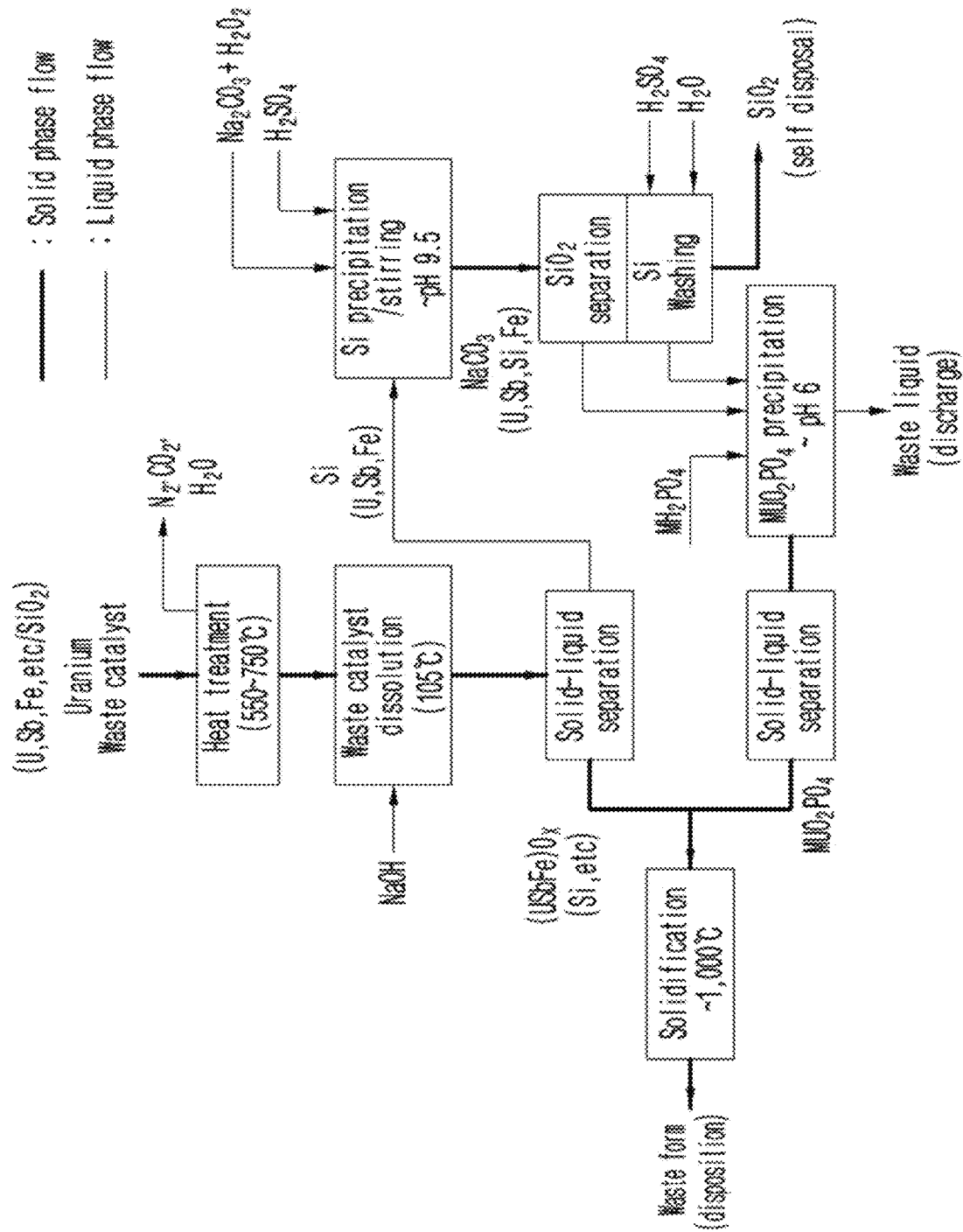
FIG. 1 is a process flow chart illustrating the treatment method of a spent uranium catalyst of the present invention designed for the volume reduction of the spent uranium catalyst.

The treatment method of a spent uranium catalyst shown in FIG. 1 of the present invention uses the chemical properties related to silicon and uranium. Particularly, the method uses many physical/chemical properties related to the selective dissolution of silicon dioxide, which occupies a large portion of the catalyst through the alkali dissolution of the spent uranium catalyst, the precipitation of dissolved silicon ions into silicon dioxide, the purification of silicon dioxide, the precipitation of uranium phosphate, the characteristics of fine particle solid-liquid separation, and the glass-ceramic solidification, etc.

Hereinafter, the treatment method of a spent uranium catalyst of the present invention is described in more detail step by step.

The uranium catalyst contains 4 to 9 wt % of depleted uranium containing about 0.2% of uranium-235, 15 to 25 wt % of antimony, and about 5 wt % of iron, etc. in a silicon dioxide support taking 50 to 60 wt % by the total volume. However, the spent uranium catalyst can contains bentonite added for treatment of used catalyst after for production of acrylonitrile, inorganic and organic compounds of various types of C-H-N components generated as side products during the use of catalyst (they look like black tar), other by-products generated from the catalytic reaction, and moisture, indicating the properties thereof are present in a very complicated state.

The spent uranium catalyst requires pre-treatment before dissolution. When tar compounds including the by-products generated during the production of acrylonitrile remain in the spent uranium catalyst, they prevent the alkali solution from contacting the support component upon dissolution of the support. Therefore, if the C-H-N compound and other containator are removed from the spent uranium catalyst through heat-treatment, the spent uranium catalyst can be more easily dissolved in the alkali solution. Also, the heat-treatment before dissolution can remove many tar-like materials, which makes the volume reduction effect of the waste itself remarkable. Therefore, it is preferred to perform the pre-heat-treatment of the target spent catalyst in order to remove water and tar-like mixed with the spent uranium catalyst. At this time, if the heat-treatment temperature is less than 500° C., the tar-like materials are not sufficiently volatilized and burned. On the other hand, if the heat-treatment temperature is higher than 650° C., the tar-like materials are carbonized, which might cause fire in the course of the heat-treatment due to scattering of the generated carbon particles. For example, the heat-treatment temperature can be in the range of 300 to 1000° C., 400 to 950° C., 450 to 850° C., 500 to 800° C., 550 to 750° C., and 500 to 650° C.

In step 1, the carbonaceous impurities present on the surface of the catalyst are removed from the spent uranium catalyst through the heat-treatment. Then, the spent uranium catalyst is immersed in an alkali solution to selectively dissolve silicon dioxide, the support component of the catalyst.

At this time, the spent uranium catalyst has a form in which $U_wSb_xM_yO_z$ is supported on a silicon dioxide support, and M is one or more materials selected from the group consisting of Fe, Al, Mo, V, and Bi; w, x, y, and z indicate the molar ratio of the elements constituting the oxide.

Silicon dioxide reacts with NaOH and dissolves in the form of sodium silicate $(Na_2OSiO_2)_n$, called water glass, and can be presented as $(2Na^+.SiO_3^{2-})$. The solubility of silicon ions is very high, such as 1~2 M at pH 14 or higher. Silicon ions are polymerized while proton ions are removed in the strong alkali condition, resulting in being a polymer ion having a high molecular weight. When the spent uranium catalyst is dissolved in the alkali condition by using its high solubility, silicon of the catalyst can be mostly dissolved. Uranium, antimony, iron and aluminum, which are very well dissolved in an acidic solution, are slightly dissolved in the alkaline condition as well. Uranium exists in the form of $UO_2^{2+}$ in the acidic condition and has a high solubility of 1 M or more. However, as the pH increases, $UO_2^{2+}$ becomes hydrolyzed and turns into $UO_2(OH)_2$, during which the solubility decreases to $10^{-8}M$ at pH 7. When the pH is continuously increased, $UO_2(OH)_2$ is converted into anions such as $UO_2(OH)_3^-$ and $UO_2(OH)_4^{-2}$) and the solubility is increased slightly to approximately $10^{-3}M$ (~200 ppm) at pH 13 or higher. Under these alkali solution conditions, iron and antimony also remain as anions with solubilities of several tens of ppm. When silicon dioxide is dissolved in an alkali solution, as the temperature of the solution goes higher, the dissolution rate and the solubility increase. So, it is preferred to use a heated alkali solution in order to effectively dissolve silicon dioxide, the support component, in the spent uranium catalyst and to increase thereby the solubility. At this time, the alkali solution can be preferably one or more solutions selected from the group consisting of a sodium hydroxide solution, a potassium hydroxide solution, a lithium hydroxide solution, and an ammonium hydroxide solution. The molar concentration of the hydroxide ion of the alkali solution required to dissolve the silicon dioxide support varies depending on the ratio of the amount of the silicon dioxide to be dissolved and the molar concentration of the hydroxide ion, but is preferably about 2 to 4 M. The temperature of the alkali solution can be raised from 100~105° C. to the boiling point.

If the molar concentration of hydroxide ions in the alkali solution is less than 2 M, the silicon dioxide support is not fully dissolved. On the contrary, if the molar concentration of hydroxide ions in the alkali solution is more than 4 M, almost all the silicon dioxide component in the spent uranium catalyst are dissolved and accordingly the structure of uranium-antimony-iron oxide, the metal oxide structure of the catalyst component in the spent uranium catalyst, is destroyed, resulting in that those components remain as ultra-fine particles in the solution, which makes the solid-liquid separation of those insoluble particles difficult. Besides, these particles could remain in the solution until the step of precipitating silicon dioxide shown in FIG. 1 to affect the radioactivity concentration of the separated silicon hydroxide precipitate to be released to environment for clearance.

When the spent uranium catalyst is dissolved by immersing in an alkali solution in step 1, the volume (mL) ratio of the alkali solution to the weight (g) of the spent uranium catalyst is 0.125 to 0.25 g/mL, preferably 0.150 to 0.225 g/mL, more preferably 0.175 to 0.210 g/mL, and most preferably 0.2 g/mL. If the volume ratio is less than 0.125, which means the amount of the spent uranium catalyst is too small for the alkali solution, the volume of the waste liquid is unnecessarily increased. If the volume ratio is more than 0.25 g/mL, which means the amount of the spent uranium catalyst is too much compared with the amount of the alkali solution to be used, the support component included in the spent uranium catalyst is not properly dissolved.

In step 2, solid-liquid separation is performed to separate the undissolved spent catalyst particles from the sodium silicate solution $(Na_2OSiO_2)_n$, the catalyst support-dissolved solution, after the dissolution in step 1. To do so, a solid-liquid separation device of pressurized media filtration type is used in which a solution is passed through the filter by pressurizing the device from outside. As for the solid-liquid separation device, a filter press or a candle type filter system using a polymer membrane or a fibrous separator is selected. After the dissolution of the spent uranium catalyst, the undissolved materials contain a large amount of ultrafine particles of less than 1 μm in size. These particles easily block the separation membrane of the solid-liquid separation system, make the solid-liquid separation difficult and cause the separation membrane to lose its function as a separation membrane by blocking pores of the separation membrane. As a result, such a separation membrane cannot be re-used and thus a new separation membrane has to be placed each time. That makes the generation of a large amount of the secondary operational waste in the course of the solid-liquid separation process.

To overcome the problem above, a separation membrane is pre-coated by putting a particulate filter-aid having a large number of pores into the filter system in advance, and then the object solution is injected to enable effective solid-liquid separation. The main component of the filter aid is silicon dioxide. At this time, the diatomite ($SiO_2$: 90% or more) having different sizes of pores is used to coat the separation membrane in advance. When the separation membrane is coated with the diatomite at a certain thickness, the ultrafine particles cannot contact the separation membrane directly but the solution flows well through the micropores of the filter-aid (diatomite), indicating that the solid-liquid separation of the slurry type solution having the ultrafine particles can be effectively performed. If the filter-aid used herein is only used for the purpose of effective solid-liquid separation, it causes another problem of increasing the volume of the final solid materials produced in the volume reduction process of the spent uranium catalyst. Therefore, the diatomite remaining in the solid of step 2 is made into a glass-ceramic medium by melting the diatomite and other materials during the immobilization step of the solid to be disposed, which is the last step of the present invention. When the diatomite is prepared as a solid for the final disposal, such a glass flux agent as $Na_2O$ or $B_2O_3$ is added thereto, followed by heating. Then, the mixture is sinterind together with those components and turns into some vitreous material, by which the volume reduces significantly. The melted vitreous component can also bind to other insoluble metal oxides, so that the entire solid becomes the sable solid form during the sintering, which leads to a high volume reduction. That is, the filter-aid (diatomite) used for the solid-liquid separation of the slurry generated in step 1 not only enhances the solid-liquid separation efficiency, but also serves as a vitreous material for immobilizing the undissolved solids generated in the subsequent process, which eventually enabling additional significant volume reduction of the final solid waste.

At this time, the mean diameter of the diatomite is not limited, but can be in the range of 30 to 40 μm.

In step 3, uranium ions dissolved in sodium silicate $(Na_2OSiO_2)_n$ solution, the catalyst support-dissolved solution, is converted into some uranium ion complex. Then, pH of the dissolved sodium silicate solution is adjusted to 10 or less to induce selective precipitation of the silicon ions present as silica in the dissolution solution. Particularly, if the solution pH is adjusted as above, the silicon solution in the form of water glass is precipitated as silicon dioxide ($SiO_2$) according to the following reaction formula due to the difference in solubility. At this time, the initially formed silica particles are very fine nano-sized particles, which are aggregated and formed into a gel state, so that the final solution has a slurry form in which solid and liquid are mixed. A silicon dioxide precipitate solid can be obtained by dewatering the slurry.

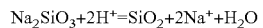

$$Na_2SiO_3+2H^+=SiO_2+2Na^++H_2O$$

At this time, in order to prevent uranium ions from being incorporated into the silicon dioxide precipitate, carbonate and hydrogen peroxide are added to the solution before the pH adjustment for the silicon dioxide precipitation to convert the uranium ions into the complex such as $UO_2(O_2)(CO_3)_2^{4-}$. To inhibit the incorporation of uranium components into the solid during the precipitation of silicon dioxide, it is necessary to minimize the coprecipitation and adsorption of uranium ions in the silicon dioxide precipitate formed in the solution. That is, in order to inhibit the coprecipitation of uranium ions, the uranium ions coexisting in the solution should be converted into complex ions having high solubility. In order to prevent the adsorption of uranium ions on the silicon dioxide precipitate, it is preferred to make the electrical charge the uranium ion and the silicon dioxide precipitate have the same polarity so as to have electric repulsion.

The uranium dissolved together with the silicon dioxide support of the spent uranium catalyst in the alkali condition is in the form of anions such as $UO_2(OH)_4^{2-}$, $UO_2(OH)_4^{2-}$, but the solubility thereof is decreased when the pH is lowered to precipitate silicon ions. Thus, uranium ions can be coprecipitated in the silicon dioxide precipitate as the form of $UO_2(OH)_2$ by the difference in the uranium solubility at the pH during the formation of the silicon dioxide precipitate. At this time, to obtain high purity silicon dioxide, a purification process comprising repeated redissolution-reprecipitation is required. In the alkali solution, uranium ions are in the form of anions. The uranium ion species with the highest solubility is $UO_2(O_2)(CO_3)_2^{4-}$. When $UO_2^{2+}$ ions meet carbonate ($Na_2CO_3$) and hydrogen peroxide ($H_2O_2$), they form $UO_2(O_2)(CO_3)_2^{4-}$ according to the following reaction formula and the solubility thereof is as high as at least 1 M.

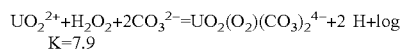

$$UO_2^{2+}+H_2O_2+2CO_3^{2-}=UO_2(O_2)(CO_3)_2^{4-}+2\,H+\log K=7.9$$

By such uranium ion complexation, most of the uranium remains in the solution as the form of ions in the course of the precipitation of silicon ions into the silicon dioxide by the pH control. At this time, pH of the solution is preferably controlled to 9~10. The $UO_2(O_2)(CO_3)_2^{4-}$ ions formed in this range can be stably present with the minimized self-decomposition. In the meantime, at these pH conditions, silicon ions have the solubility of less than 200 ppm and are precipitated as silicon dioxide. The surface of the silicon dioxide particles generated in such condition has negative Zeta potential, indicating it has repulsive force to the $UO_2(O_2)(CO_3)_2^{4-}$ ions remaining in the solution, resulting in the suppression of adsorption of uranium ions. Therefore, when carbonate and hydrogen peroxide are added into the separated sodium silicate solution and pH of the solution is adjusted to 9~10 to precipitate silicon dioxide, uranium ions remain in the solution as much as possible and only silicon ions can be selectively precipitated in the form of silicon dioxide. At this time, an acid to control the pH can be nitric acid, sulfuric acid, or phosphoric acid, but sulfuric acid is preferably used in order to avoid environmental hazard of the waste solution discharged in the final process, that is, to meet the discharge limit of total nitrogen and total phosphoric acid.

In step 4, in order to perform the solid-liquid separation to separate the silicon dioxide solid formed in step 3 and the solution containing uranium ions, a solid-liquid separation device such as a filter press or a candle type filter system using media filtration is used. The silicon dioxide solid formed in step 3 can be easily turned into a solid cake simply by de-watering process such as the solid-liquid separation. The particulate filter-aid like the one used in step 2 is not required in this step. The silicon dioxide solid cake separated by the solid-liquid separation device such as a filter press can contain uranium solution on the surface and within its pores. Thus, to wash out the remaining uranium solution, the washing solutions such as water and an acid solution are circulated in-situ into the separated solid cake in the solid-liquid separation device. At this time, if the U radioactivity of the washed final solid cake subject to release to environment for clearance does not meet the standard <1 Bq/g, the separated cake is placed in 1~2 M NaOH, followed by heating at 60~80° C. to dissolve the cake completely. Then, by repeating the precipitation process of silicon dioxide used in steps 3, the purified silicon dioxide solid cake in which the uranium concentration is lowered under the self disposal level can be made.

In step 5, in order to treat the uranium wastewater generated in step 3, all the generated solutions are put into one tank, wherein uranium ions are precipitated into uranium phosphate form and the separated solution is discharged into the environment.

At this time, the phosphate added to precipitate uranium ions into uranium phosphate can be added at the concentration of 0.1 to 6 mM in resulting solution separated through the solid-liquid separation, and preferably at the concentration of 0.2 to 4 mM, more preferably 0.3 to 2 mM, and most preferably at the concentration of 1 mM. If the concentration of the phosphate is less than 0.1 mM, the amount of the phosphate added is too small to induce the precipitation into uranium phosphate easily. On the contrary, if the concentration of the phosphate added thereto is more than 6 mM, the amount of the phosphate exceeds the required amount for the possible precipitation of uranium ions and thus the concentration of phosphorus in the discharged water increases, resulting in additional step of phosphate removal in the solution.

In the patent reference 1 mentioned above in the prior art, hydrogen peroxide ($H_2O_2$) is added to the final solution and the pH is adjusted to 2.5 to 3.5 to precipitate uranium ions into $UO_4$ in order to treat the uranium wastewater discharged in the process similar to the process of the present invention.

However, from the preliminary experiments performed by the present inventors, it was observed that once the $UO_4$ precipitation was induced by reacting $UO_2^{2+}$ ions with hydrogen peroxide, the precipitation rate and efficiency depended on the amount of salt present in the solution, that is, the ionic strength. In particular, the precipitation was greatly affected by the concentration of the silicon ions included in the solution. In the process of $UO_4$ precipitation, when uranium ions stayed at a high concentration with other ions, particularly when the concentration of $Si^{4+}$ ions was higher at a certain level, the rate and efficiency of $UO_4$ precipitation was significantly decreased.

Figure 2:
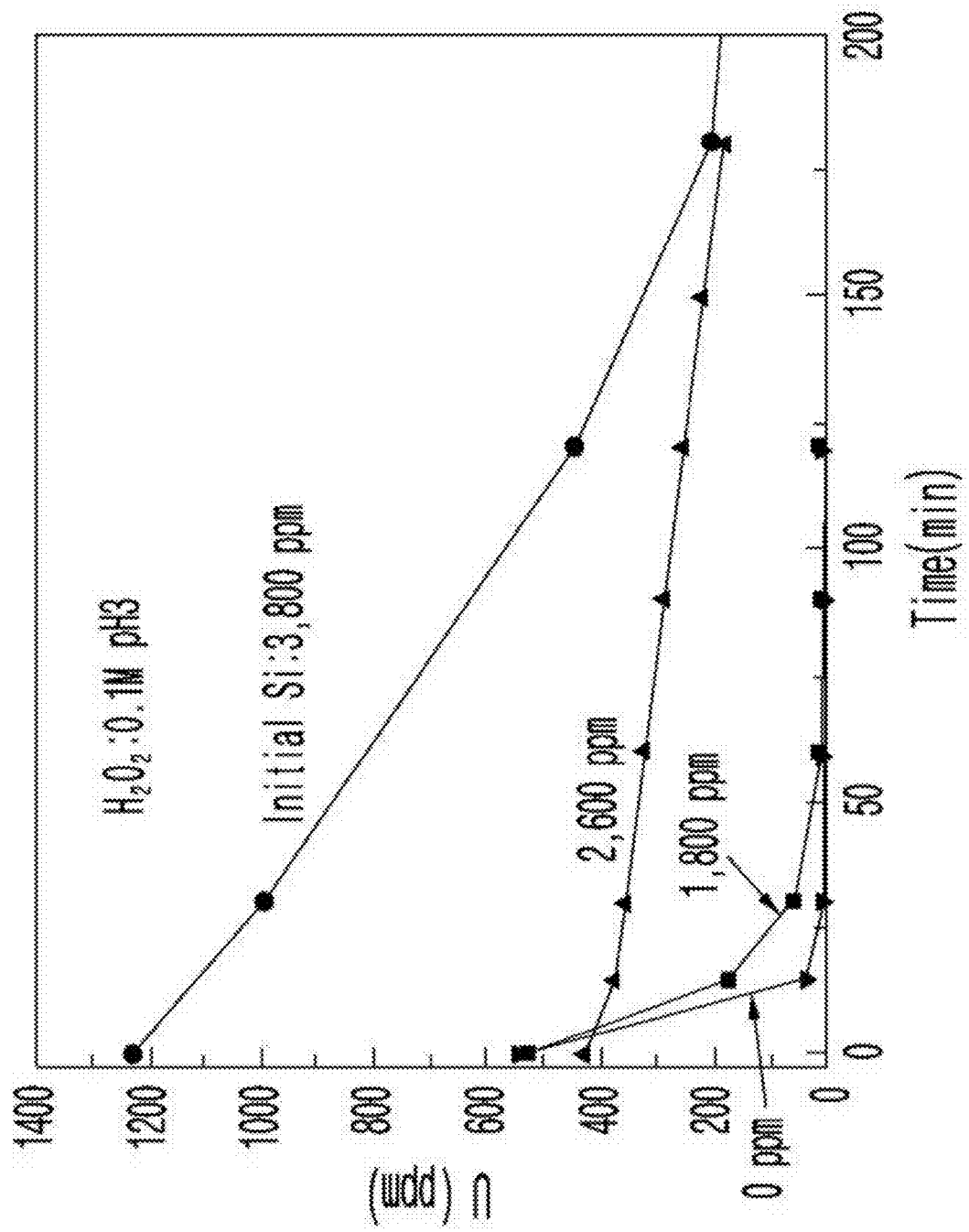
FIG. 2 is a graph illustrating the $UO_4$ precipitation depending on the initial Si concentration in the solution when the $UO_4$ precipitation method is used to treat uranium waste liquid.

As shown in FIG. 2, hydrogen peroxide was added at the concentration of approximately 0.1 M to the final solution having various initial silicon ion concentrations, generated during the separation of the silicon dioxide solid and washing thereof, to treat the uranium wastewater as described in the conventional patent, and the pH of the solution was adjusted to 3. Then, it shows the concentration changes of uranium that can be eliminated from the solution by $UO_4$ precipitation.

After the precipitation of silicon, the supernatant is saturated with silicon ions. These high concentrations of silicon ions in the alkaline condition are known to combine with each other in the solution over the time to form a gel. $UO_4$ precipitation of $UO_2^{2+}$ ions is known to be faster with the higher initial uranium concentration. According to the conventional method, the acid solution left after washing the separated silicon dioxide solid is contacted with the undissolved solids separated by the solid-liquid separation in step 2 to elute uranium. This solution is added to the solution in the $UO_4$ precipitation step to increase the initial uranium concentration, followed by further precipitation of $UO_4$. In the experiment shown in FIG. 2, the solution from which uranium was eluted was mixed with the solution that washed the silicon dioxide solid. The sample solution contained uranium ions at the concentration of about 400 ppm to 1,200 ppm and silicon ions at the concentration of about 2,000 ppm to 4,000 ppm according to the mixing ratio of the solutions above. Approximately 0.1 M of hydrogen peroxide was added to the final uranium solution, and the pH was adjusted to 3, followed by stirring at about 200 rpm. Then, the uranium concentration changes of the solution were analyzed by ICP-OES (Analytikjena PQ9000 Elite).

As shown in FIG. 2, when the initial concentration of silicon ions was more than 2,000 ppm in the initial solution, the $UO_4$ precipitation rate was significantly reduced even at the high initial uranium concentration, and the higher the initial uranium concentration, the faster the precipitation rate. In FIG. 2, the results of the experiment performed by excluding silicon ions from the initial solution are shown. In this case, the precipitation rate was very fast and after 2 hours the uranium concentration of the solution was less than 1 ppm. Also, the concentration of silicon ions was not changed during the $UO_4$ precipitation process. The role of silicon ions to intervene the $UO_4$ precipitation in the course of $UO_4$ precipitation can be explained as follows:

In general, when silicon ions are present at a high concentration in a solution, these ions are polymerized as time goes by and converted into a gel-type polymer having a complicated structure. Such silica gel can easily form a complex with metal ions. In the course of $UO_4$ precipitation, the silicon ions present at the concentration of thousands ppm are aggregated into a gel, which is adsorbed to the uranium ions ($UO_2^{2+}$) in the solution and remains therein without participating in the precipitation of uranium ions into $UO_4$. In fact, after the $UO_4$ precipitation, numbers of fine particles are suspended in the form of silica gel in the supernatant.

In the step 5 of the uranium wastewater treatment, a solution containing silicon ions at a high concentration is inevitably flowing in. Thus, a new method of precipitating uranium ions with high stability and efficiency without being affected by silicon ions has been attempted in this invention. Uranium ions can form uranium phosphate displaying a very low solubility with phosphate ions ($PO_4^{3-}$) according to the following reaction formula.

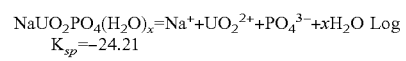

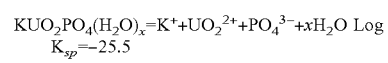

$$NH_4UO_2PO_4(H_2O)_x = NH_4^+ + UO_2^{2+} + PO_4^{3-} + xH_2O$$
$$\text{Log } K_{sp} = -26.5$$

$$UO_2(O_2) + 2H^+ = UO_2^{2+} + H_2O_2 \quad \text{Log } K_{sp} = -2.88$$

Their solubility becomes the lowest at pH 5-7. The solubility of uranium phosphate is much lower than the solubility of $UO_4$. In this invention, the all the solutions generated from the solid-liquid separation and the washing of silicon dioxide in the step 4 are mixed altogether, to which phosphate ($NaH_2PO_4$, $KH_2PO_4$, or $NH_4H_2PO_4$) is added, followed by its pH-control to 5-7. Then, the uranium ions in the solution are precipitated as uranium phosphate. The uranium concentration of the solution can be reduced to less than 1 ppm very quickly through the precipitation process without being affected by other salts present in the solution. Ammonium ($NH_4^+$) ions that can cause environmental problems can remain in the $NH_4H_2PO_4$ solution, so it is preferred to use $NaH_2PO_4$ or $KH_2PO_4$.

In step 6, the uranium phosphate precipitate formed in step 5 is separated from the supernatant. In this step, a solid-liquid separation device such as a filter press or a candle type filter system that uses media filtration without the use of a particulate filter-aid is used because the target precipitate particles are sufficiently large and uniform. If the uranium concentration in the separated supernatant is low enough, it can be discharged to environment. The separated uranium phosphate precipitate is combined with the undissolved solid separated in step 2, followed by solidification for disposal at the radioactive waste disposal site. The concentration of uranium partially dissolved with silicon dioxide in the dissolution process of the spent uranium catalyst in step 1 is very small, ranging from 200 to 300 ppm. This uranium is finally precipitated in step 5, so the volume of the uranium phosphate separated by precipitation is much smaller than the volume of the undissolved solid separated in step 2.

Step 7 is a step of solidifying the solids generated in steps 2 and 6 for final disposal. The solids generated in steps 2 and 6 are in the form of fine particles and cannot meet the acceptance criteria of the domestic disposal site. That is, such dispersed wastes must be immobilized, and the dispersed wastes have to be prepared as solids that can satisfy certain physical properties to be treated. In order to immobilize the particulate solid containing uranium generated in the process of the present invention, the composition is controlled and sintered to form a more sable structure in the form of glass-ceramic. In the process, the volume of the glass-ceramicized material becomes smaller than the volume of the original particulate solid, which indicates the additional volume reduction effect is obtained and accordingly the volume reduction yield of the entire waste to be treated can be improved.

In the prior art, cement solidification is performed for the immobilization of the material to be treated. In this process, the volume of the final target material is greatly increased due to the addition of cement. The main component of the cement solidification medium, CaO, turns into highly alkaline calcium hydroxide ($Ca(OH)_2$) when it reacts with water. At this time, uranium oxide can be decomposed into uranium hydroxide ions ($UO_2(OH)_x^{y-}$), resulting in the problem of uranium leaching of the solid. Due to such cement solidification characteristics, when the uranium oxide containing solid is immobilized by the cement solidification, the volume thereof is increased and undesirable solid leaching is induced.

In the solid separated in step 2 of the present invention, the water-glass solution component generated in the course of the dissolution process of step 1 remains therein. When the water-glass ($Na_2OSiO_2)_n$ solution is heated and dried, it is transformed into a solidified binder material through the dehydration process, and it can serve to immobilize the particulate solid material to be subjected to step 7. The solid separated in step 2 contains about 10 vol % of $SiO_2$ component from the undissolved support and diatomite used as a filter-aid. When $Na_2O$ or $B_2O_3$, the glassification agent (glass flux), is added thereto and the mixture is heated, the Si and Na oxide components are converted into soda limeglass or borosilicate glass. These materials are co-melted with other metal oxides ($Sb_2O_5$, $Fe_2O_3$, and $U_3O_8$) present in the undissolved solid, making the entire structure into a glass-ceramic medium, which results in the entire volume being shrunk while the entire target waste is being immobilized. In addition to the first volume reduction to decrease the waste volume of the spent uranium catalyst by the dissolution process of the present invention, the inventive process stabilizes the waste to be treated and improves the volume reduction efficiency of the spent uranium catalyst by introducing them into the glass-ceramic solidification process.

Herein, the glassification agent can be added at the concentration of 5 to 20 weight %, preferably 7 to 15 weight %, more preferably 9 to 13 weight %, and most preferably 10 weight % by the total silicon weight of mixture of the undissolved solid separated in step 2 and the uranium phosphate precipitate separated in step 6. If the glassification agent is added at the concentration of less than 5 weight % by the total silicon oxide weight of the waste to be immobilized, the glass-ceramic solidification process cannot be completely induced. If the glassification agent is added at the concentration of more than 20 weight % by the total silicon oxide weight of the waste to be immobilized, the vitrification can be interrupted.

The temperature for sintering of above prepared material is 700 to 1200° C., preferably 800 to 1150° C., more preferably 900 to 1130° C. or 1000 to 1110° C., and most preferably 1100° C. If the temperature is lower than 700° C., the heat is not enough to induce glassification fully so that the volume reduction efficiency is lowered. If the temperature is higher than 1200° C., energy is wasted because of excessively high temperature more than necessary for the immobilization and of high costs for the heat treatment equipment.

A general soda-lime glass is composed of approximately 73 wt % $SiO_2$+16 wt % $Na_2O$+10 wt % CaO+1 wt % $Al_2O_3$. A general borosilicate glass is composed of 81 wt % $SiO_2$+13 wt % $B_2O_3$+4 wt % $Na_2O$+10 wt % CaO+2 wt % $Al_2O_3$. In glass, $SiO_2$ has an amorphous network structure. The melting point, physical properties, color and various characteristics of glass can be changed by adding a glass former which forms an amorphous structure and various oxide type additives such as $Na_2O$, $B_2O_3$, CaO, MgO, $PbO_2$, and $F_2O_3$.

Among those additives, $Na_2O$ plays a role as a glass solvent (Flux) to lower the melting point of the glass structure material, while $B_2O_3$ acts as a glass forming agent but also plays a role as a flux to change the phase and physical properties of a ceramic material (metal oxide) by reacting to the ceramic material. The vitrified material can encapsulate a refractory material of metal oxides and can immobilize the entire target waste. This kind of structure is the glass-ceramic composite structure wherein vitreous and ceramics coexist. In this invention, a method to reduce the volume of the entire waste is provided, wherein the water-glass component remaining in the undissolved solid left in the spent uranium catalyst-dissolution solution obtained in step 1 by using NaOH, and the filter-aid ($SiO_2$ diatomite) used for the solid-liquid separation of the undissolved minute solid obtained in step 2 were mixed with such additives as $Na_2O$ and $B_2O_3$, followed by sintering them to prepare the glass-ceramic composite material. The mixture material was melted and thus combined with the solids ($Sb_2O_5$, $Fe_2O_3$, and $U_3O_5$), by which the entire target waste to be disposed became stable and more solidified, leading to the volume reduction in the end. The wastes thus produced have high mechanical strength and have low leaching properties of uranium from the immobilized uranium oxide.

The treatment method of a spent uranium catalyst of the present invention comprising the steps 1 to 7 described above can be carried out in the following steps 1 to 7 when the steps are further specified:
- dissolving the spent uranium catalyst by immersing thereof in an alkali solution (step 1);
- performing solid-liquid separation using diatomite powder as a filter-aid to effectively separate the dissolution solution and the undissolved microparticulate material of step a (step 2);
- making the partially co-dissolved uranium in the dissolution solution separated in step 2 into complex ions and then precipitating the dissolved silicon ions selectively as the form of a silicon dioxide solid slurry by regulating pH (step 3);
- performing solid-liquid separation to separate the uranium complex solution and the silicon dioxide solid from the solid slurry of step 3 and washing the separated solid by using acid and water (step 4);
- adding phosphate to the uranium wastewater generated in step 4 to selectively precipitate uranium ions into uranium phosphate (step 5);
- performing solid-liquid separation to separate the supernatant and the uranium phosphate precipitate generated in step 5 (step 6); and
- mixing the solids separated in steps 2 and 6, to which vitrification additives are added, followed by heat-treatment to immobilize the solids in the form of a glass-ceramic composite medium (step 7).

Practical and presently preferred embodiments of the present invention are illustrative as shown in the following Examples.

However, it will be appreciated that those skilled in the art, on consideration of this disclosure, may make modifications and improvements within the spirit and scope of the present invention.

Experimental Example 1: Evaluation of Volume Reduction of Spent Uranium Catalyst Step 1: Selectively Dissolving the Support Component by Immersing the Spent Uranium Catalyst in an Alkali Solution As shown in FIG. 1, in order to dissolve the spent uranium catalyst in step 1 of the present invention, the spent uranium catalyst without tar-like component was added into 4 M NaOH solution, followed by dissolving at a boiling temperature (approximately 105° C.) for 4 hours with sufficient stirring. At this time, the volume ratio of the spent catalyst to NaOH was adjusted to 0.2 g (catalyst weight)/mL (NaOH solution volume).

After dissolving the spent uranium catalyst by immersing thereof in the alkali solution, the major component of the non-dissolved solid was analyzed by EDS (Energy dispersive x-ray Spectroscopy, Bruker Namo, Xflash Detector 410-M) and the results are shown in Table 1 below.

TABLE 1

| TK1 | Before dissolution | After dissolution |
|---|---|---|
| Si | 43.8 | 1.8 |
| Sb | 34.5 | 61.9 |
| Fe | 18.4 | 24.7 |
| U | 3.3 | 11.6 |
| Total | 100.0 | 100.0 |

Table 1 shows the results of EDS analyzing the solid components before and after dissolution of the spent uranium catalyst in the alkali solution.

As shown in Table 1 above, the silicon content was changed from 43.8 wt % to 1.8 wt % after the dissolution. So, approximately 96% of the silicon component of the initial spent uranium catalyst was dissolved. However, antimony, uranium, and iron were dissolved only a little, unlike silicon, the composition ratio of those components in the undissolved solid remaining after the dissolution was significantly increased. Therefore, it was confirmed that only the silicon component, the support of the spent uranium catalyst, was selectively dissolved in the alkali solution.

The volume reduction efficiency by the dissolution in step 1 was calculated by measuring the tap density values of the sample before the dissolution and the undissolved solid after the dissolution and measuring the weight thereof before and after the dissolution. The tap density values of the sample before the dissolution and the undissolved solid after the dissolution were 1.06 and 2.1, respectively, and the volume reduction efficiency by the dissolution was about 69%.

To dissolve the spent uranium catalyst containing various components including tar-like material in the dissolution process, pre-heat-treatment was performed at 600° C. for about 2 hours to eliminate C-H-N components from the surface of the catalyst, which is necessary step to keep these materials from interrupting the dissolution process.

Step 2: Separating the Dissolution Solution and the Undissolved Solid Materials in the Step 1 by Solid-Liquid Separation In step 2 of FIG. 1, after the dissolution in step 1, the undissolved solid was separated by solid-liquid separation and the silicon ions present in the dissolution solution were selectively precipitated.

First, in order to separate the solution of the catalyst support dissolved in step 1 and the undissolved solid, solid-liquid separation was performed by using a filter press equipped with a fibrous separation membrane (250 mm×250 mm) made of polypropylene capable of filtering particles of 0.5 to 1 μm.

Figure 3:
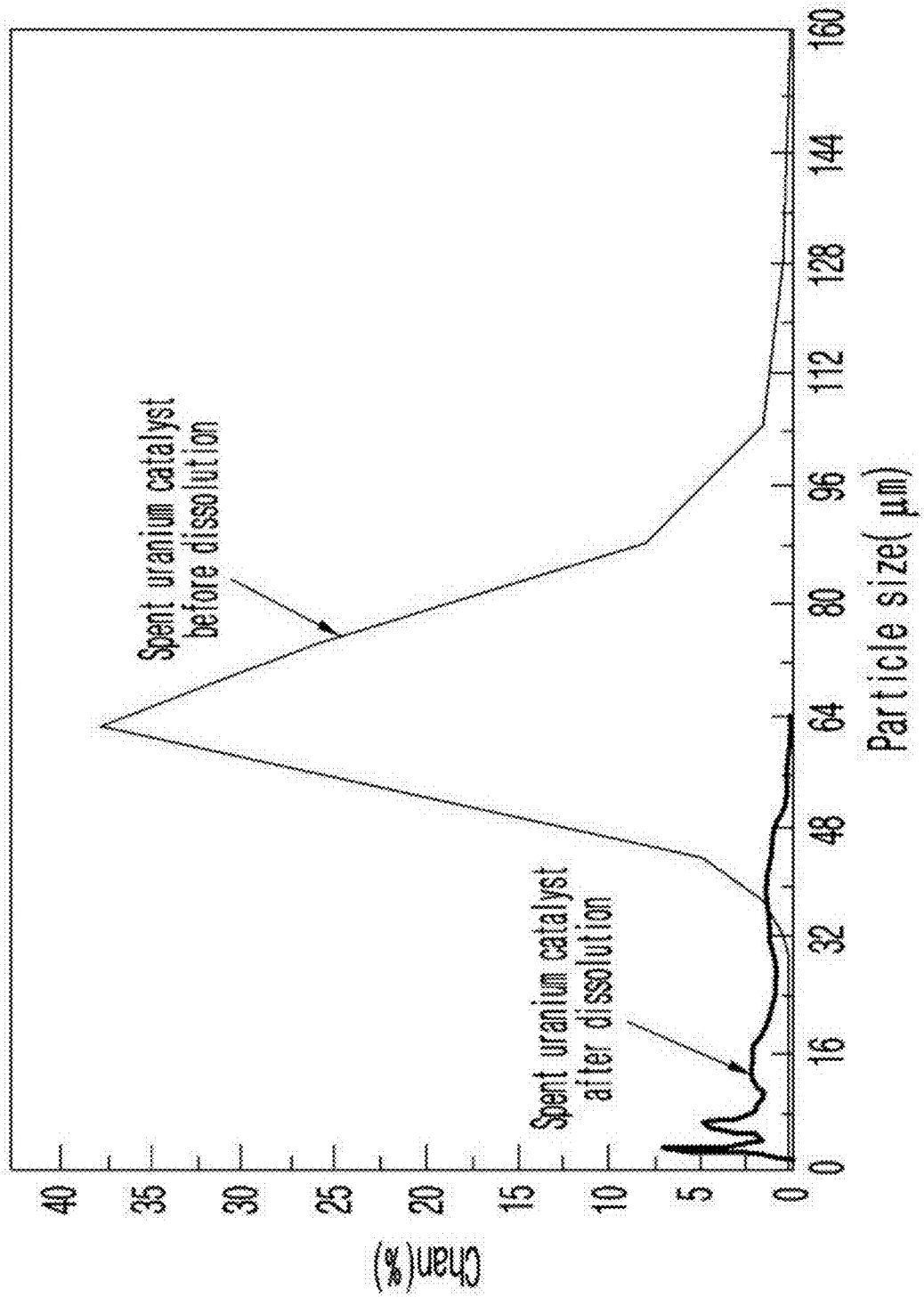
FIG. 3 is a graph illustrating the changes in the spent uranium catalyst particle before and after inducing the selective dissolution of the support component by immersing the spent uranium catalyst in an alkali solution.

In the dissolution process in step 1, silicon dioxide, the support component of the spent uranium catalyst, was selectively dissolved to generate a high concentration sodium silicate solution ($Na_2OSiO_2$)$_n$. In the undissolved solid, only uranium-antimony-iron oxide, the metal oxide component of the catalytic component, remained in the form of ultrafine particles. FIG. 3 shows the results of measurement of the changes in the spent uranium catalyst particle before and after the dissolution in step 1 using a particle size analyzer (Microtrac S3000). The particle size before the dissolution was 52.7 μm at average and the regular distribution was observed. However, the average size of the particles after the dissolution was 2.8 μm and the size distribution was irregular and the ultrafine particles in the size of less than 1 μm were observed.

In the sodium silicate solution ($Na_2OSiO_2$), dissolved at a high temperature, silicon ions were partially formed into gel by the difference of solubility at room temperature, and the viscosity of the whole solution was increased. When the particles in the size less than 1 μm are separated from the solution in such a condition, those fine particles easily block the pores of the separation membrane of filter press system, so that the solid-liquid separation is interrupted and the separation membrane is hard to be reused because the surface of the separation membrane is covered with the mud-like materials due to the fine particles. So, the separation membrane has to be replaced with a new one every time in that condition, which causes a problem of generating a large amount of secondary operating waste. To overcome the problem, the separation membrane surface of the filter press was coated with a porous filter-aid having many fine pores and then solid-liquid separation of the slurry solution generated in step 1 was performed. The filter-aid used herein is diatomite (KD 801V) having an average particle size of 34 μm, which was coated on the surface of the separation membrane at the thickness of 1 to 2 mm. At this time, if the filter-aid is used only for the efficient solid-liquid separation, the result would be only the increase of the volume of the final solid generated in the process of reducing the spent uranium catalyst volume. However, the diatomite used in this invention contains more than 90 wt % of $SiO_2$, 3.8 wt % of $Al_2O_3$, and 1.3 wt % of $Fe_2O_3$, indicating that diatomite has the components that can form a glass, as described hereinbefore. So, if a glass flux such as $Na_2O$ or $B_2O_3$ is added thereto and heated, it is vitrified and combined with the undissolved solids, resulting in the volume reduction effect along with the improvement of strength in addition to the inhibition of uranium leaching.

The separation membrane is pre-coated by injecting a particulate filter-aid having a large number of pores in the filter press system and then a target solution is injected thereto in order to perform the efficient solid-liquid separation. At this time, if diatomite ($SiO_2$ component: at least 90%) having silicon dioxide as a main component and a large number of pores is used as a filter-aid, the target ultra-fine particles are not directly contact with the separation membrane and instead the solution flows through the micropores of the filter-aid, resulting in the efficient solid-liquid separation of the ultra-fine particle mixed slurry.

Figure 4:
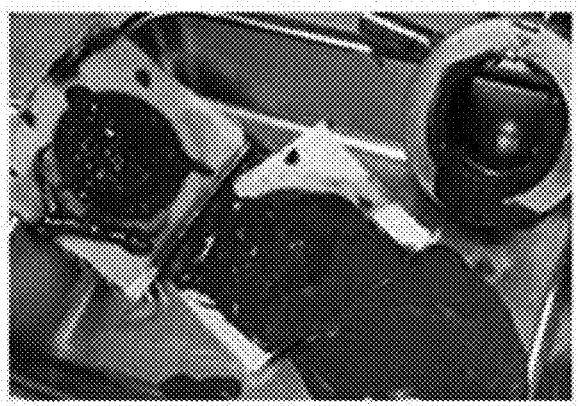
FIG. 4 is a set of photographs illustrating the state of the solid material separated depending on using diatomite or not in the course of the separation of the insoluble materials in a filter press.
Figure 4:
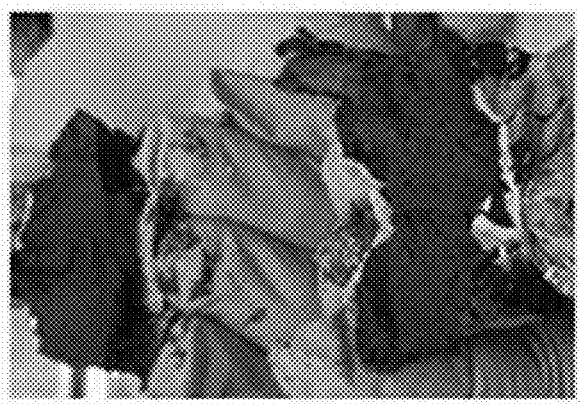
Figure 4:
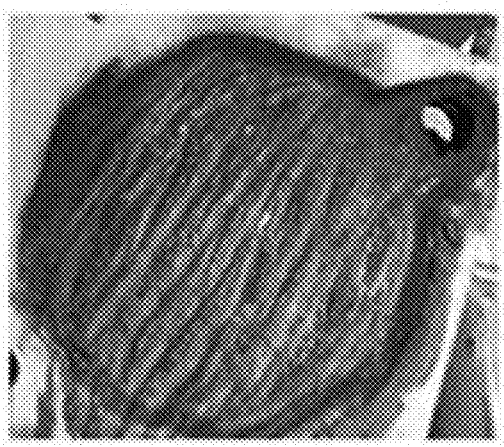
Figure 4:
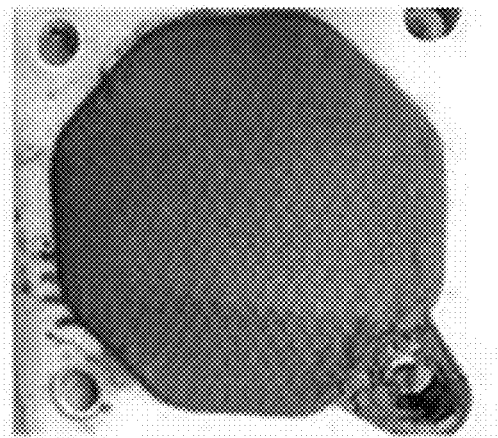

FIG. 4 is a set of photographs illustrating the state of the solid material separated depending on using diatomite or not in the course of the separation of the insoluble materials in laboratory scale and bench scale filter presses. When the separation membrane was used without using the filter-aid, the separation membrane was blocked by the fine particle sludge, the solid-liquid separation rate became very slow, and the separated solid did not form a rigid cake and instead remained as slurry. Therefore, it was confirmed that the separation membrane became clogged and contaminated with the slurry and became very difficult to be reused. In the meantime, when the filter-aid was used, the filter-aid first contacted with the separation membrane and the solution passed easily through the micropores in the filter-aid particles. Therefore, the solid-liquid separation rate was relatively fast, and the separated solid formed a rigid cake. Besides, after the cake separation, the surface of the separation membrane was less contaminated, indicating the separation membrane could be repeatedly reused.

The addition of the filter-aid that could help the solid-liquid separation might increase the volume of the separated solid approximately 10% but this filter-aid would be used as a vitreous material for the immobilization of the solid to be disposed later, resulting in the remarkable volume reduction in the end.

Step 3 and Step 4: Selectively Precipitating the Silicon Ions Included in the Dissolution Solution Separated in Step 2 as Silicon Dioxide, and Separating the Silicon Dioxide Generated in Step 3 by Solid-Liquid Separation and its Purification To precipitate/separate silicic acid from sodium silicate solution $(Na_2OSiO_2)_n$, the catalyst support dissolution solution separated in step 2, pH of the sodium silicate solution was adjusted to 10 or less in the step 3. In this experiment, pH of the solution was adjusted to 9.3. At this time, in order to inhibit the precipitation of uranium ions coexisting in small amounts, the uranium ions were converted into $UO_2(O_2)(CO_3)_2^{4-}$ complex by adding 0.05 M carbonate ions ($CO_3^{2-}$) and 1 M hydrogen peroxide ($H_2O_2$) to the precipitation solution.

When pH of the solution was adjusted during stirring, the silicon dioxide particles in the solution formed a gel and changed into a slurry state.

In the step 4 for the solid-liquid separation of the sludge solution, solid-liquid separation was performed using a filter press equipped with a fibrous separation membrane (250 mm×250 mm) made of polypropylene capable of filtering 0.5 to 1 μm particles, by which the hard silicon dioxide was separated into a cake form in the cell of the filter press.

Figure 5:
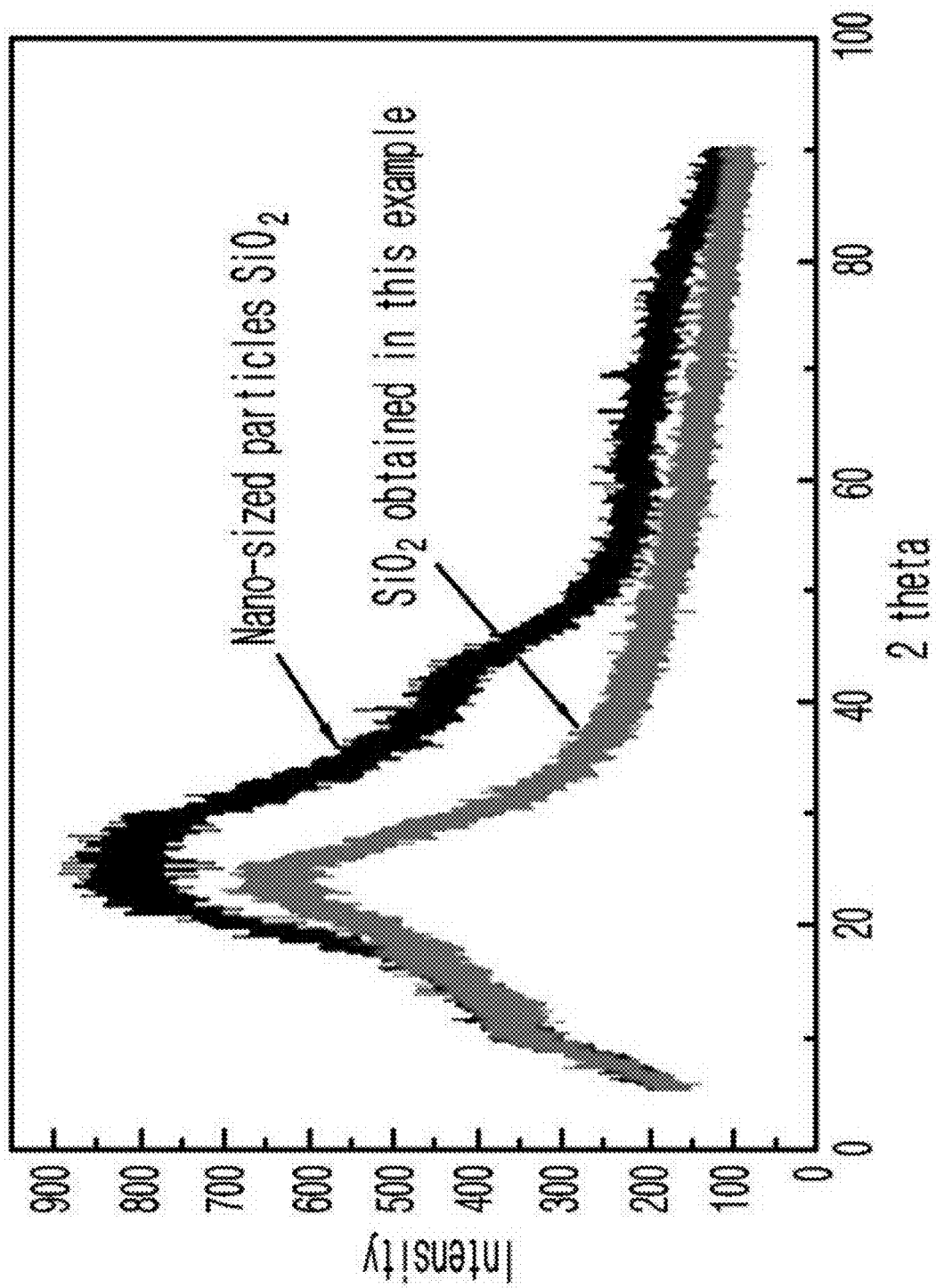
FIG. 5 is a XRD graph illustrating the silicon dioxide cake recovered in the filter press.

The precipitated silicon dioxide has an amorphous crystal structure due to the binding form of nano-size $SiO_2$ particles. To wash the uranium ion solution remaining within the silicon dioxide cake separated in the filter press, 0.5 M sulfuric acid was circulated inside the filter press, followed by circulation of distilled water. FIG. 5 shows the results of XRD (Bruker, D2 Thaser) analysis of the silicon dioxide cake recovered from the filter press. As a result, it was confirmed that the cake had the same amorphous structure as the one of the commercial nanoparticle silicon dioxide, unlike the silicon dioxide peak showing the general crystallinity.

If the silicon dioxide cake was not fully washed after washing with acid and distilled water after the solid-liquid separation, the silicon dioxide cake was placed in 2 M NaOH, followed by heating at 60 to 80° C. Then, redissolution was easily induced. Step 3 and step 4 were repeated to give the purified silicon dioxide cake.

In this invention, the uranium radioactivity of the silicon dioxide cake (the first one) obtained by the solid-liquid separation and the silicon dioxide purified by step 3 and step 4 was measured by using α-spectrometer (Alpha Analyst, CANBERRA). The radioactivity of the silicon dioxide cake primarily separated by precipitation was 3.448 Bq/g and the radioactivity of the silicon dioxide purified once was approximately 0.565 Bq/g, which was lower than the clearance criteria. Therefore, it was confirmed that the support component, silicon dioxide, selectively separated from the spent uranium catalyst was easily separated to an acceptable level which was lower than the clearance criteria.

Step 5: Precipitating Uranium Ions as Uranium Phosphate by Adding Phosphate to the Separated Residual Solution In order to treat the uranium wastewater separated by the solid-liquid separation above, all the generated solutions were put into one tank. To precipitate uranium ions into uranium phosphate, one of phosphates such as $NaH_2PO_4$, $KH_2PO_4$, and $NH_4H_2PO_4$ was added thereto, and then the pH was adjusted to 5 to 7. As a result, the uranium ions were precipitated in the form of $MUO_2PO_4$ (M=K, Na, $NH_4$) and the remaining supernatant was discharged.

In Table 2 below, the concentration of each element present in the waste liquid comprising all the solutions generated in the course of the solid-liquid separation/washing is presented. Among them, the initial concentration of uranium is confirmed to be about 92 ppm.

TABLE 2

|    | ppm   | mM    |
|----|-------|-------|
| Si | 225.0 | 8.036 |
| Sb | 106.1 | 0.870 |
| K  | 22.7  | 0.582 |
| U  | 91.7  | 0.385 |
| Ca | 7.0   | 0.175 |
| Al | 1.80  | 0.067 |
| Mg | 1.33  | 0.055 |
| Fe | 2.14  | 0.038 |
| Zn | 2.06  | 0.032 |
| Mo | 1.00  | 0.010 |

Figure 6:
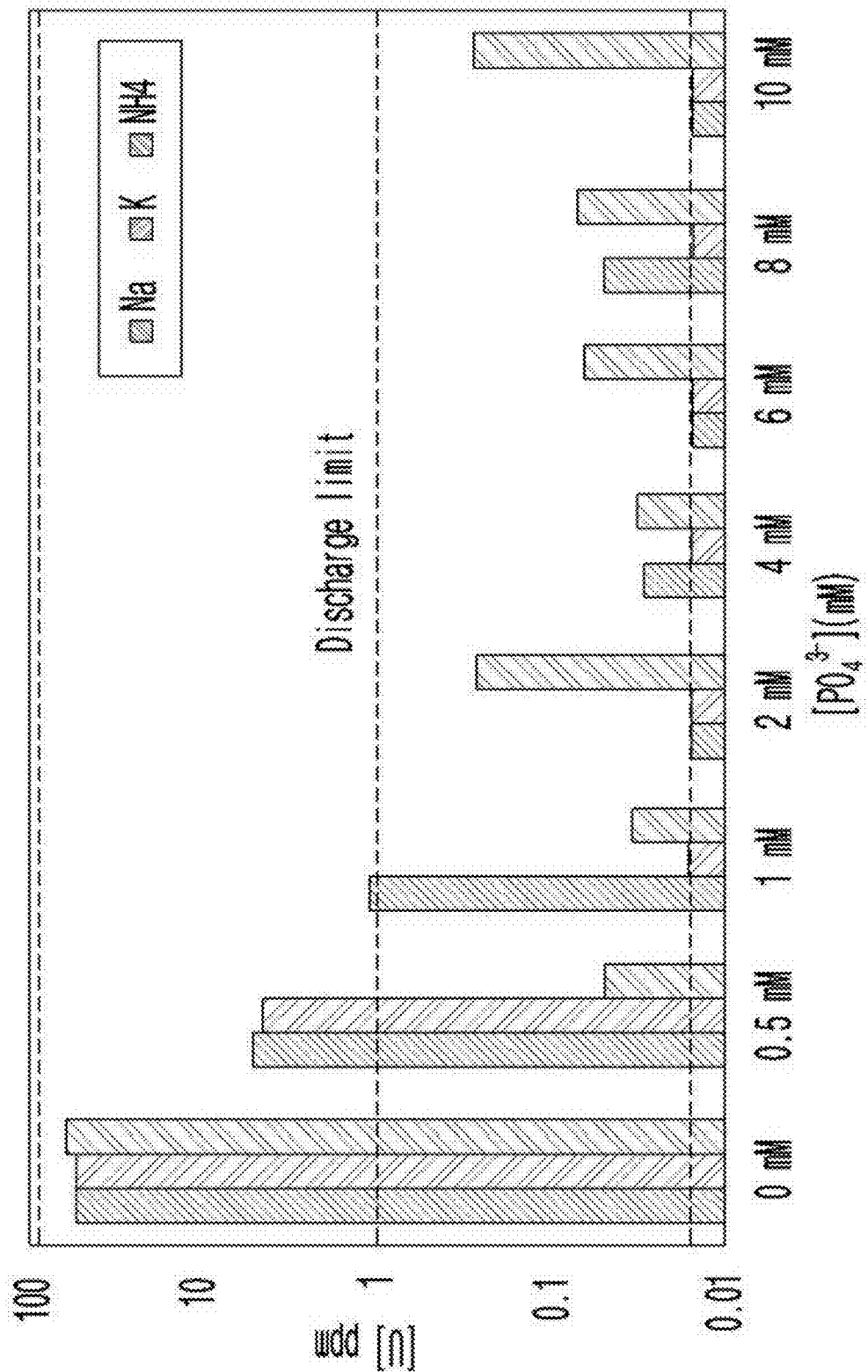
FIG. 6 is a graph illustrating the concentration of uranium in the supernatant 2 hours after the uranium precipitation according to the type of phosphate and the concentration of phosphate ions.

To discharge this wastewater, the concentration of uranium should be lowered to 1 ppm or less. So, uranium phosphate precipitation experiment was performed with the uranium wastewaster having the composition of Table 2 in order to confirm the uranium removal characteristics according to the phosphate type and the phosphate solution concentration, and the results are shown in FIG. 6. In this experiment, $NaH_2PO_4$, or $KH_2PO_4$, or $NH_4H_2PO_4$ was added thereto at different concentrations, followed by stirring at 180 rpm. The pH was adjusted to 5. 2 hours later, the precipitation supernatant was filtered with 0.2 μm filter. Uranium therein was analyzed by using ICP-OES (Analytikjena PQ9000 Elite).

As shown in FIG. 6, as the phosphate concentration was increased, the residual uranium concentration after the precipitation was reduced. Among the three phosphates above, when $KH_2PO_4$ was used at the concentration of 1 mM or more, the efficiency was most excellent. At this time, the residual uranium concentration was 0.016 ppm which was the ICP-OES analysis limit. When $NH_4H_2PO_4$ was added thereto at the concentration of 1 mM or less, high efficiency was guaranteed but when $NH_4H_2PO_4$ was added at the concentration of more than 1 mM, the efficiency was decreased lower than that of when using $NaH_2PO_4$ or $KH_2PO_4$. Therefore, it was confirmed that the use of $NaH_2PO_4$ or $KH_2PO_4$ was effective because the residual ammonium ($NH_4^+$) concentration after the precipitation reaction was subject to the discharge regulation.

Figure 7:
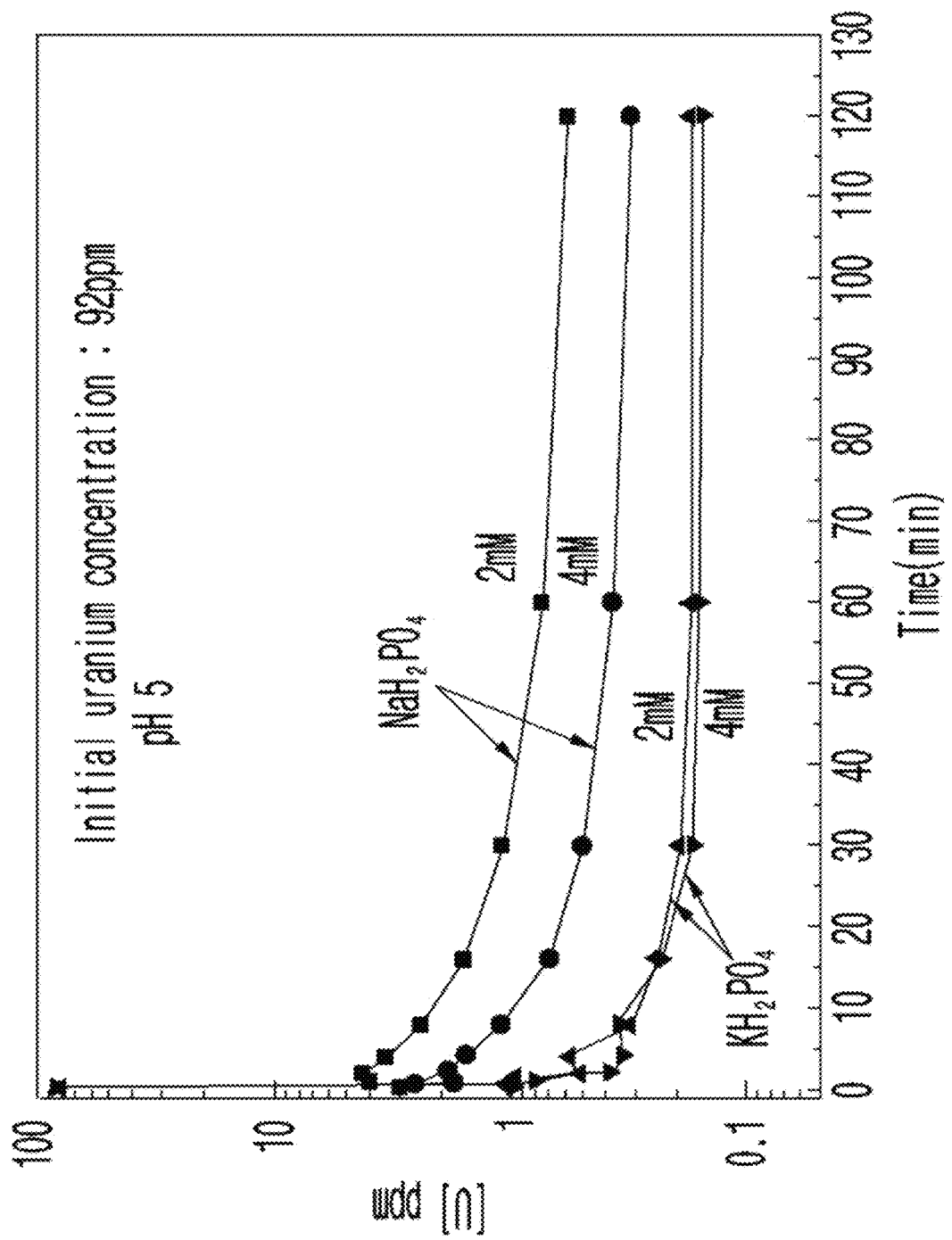
FIG. 7 is a graph illustrating the time-dependent concentration of uranium in the supernatant after uranium precipitation according to the type of phosphate and the concentration of phosphate ions.

FIG. 7 shows the time-dependent uranium concentration changes in the solution by the addition of $NaH_2PO_4$ and $KH_2PO_4$ at the concentration of 0.2 mM and 0.4 mM, respectively. When $KH_2PO_4$ was used, compared with when $NaH_2PO_4$ was used, the uranium precipitate removal rate was faster and the removal efficiency was also excellent when the same amount of phosphate was used. When $KH_2PO_4$ was used, the uranium precipitation was completed within 15 minutes.

From the above results, it was confirmed that the method of the present invention to precipitate uranium in the form of uranium phosphate in order to eliminate uranium remaining in the wastewater was more effective than the conventional method of precipitating uranium in the form of $UO_4$.

Phosphate ions might be remaining in the supernatant after the precipitation in the process above. The domestic discharge limit of the phosphorus component is 2 ppm. The remaining phosphate ions can be easily precipitated and removed by adding ion ions ($Fe^{3+}$).

Step 6: Separating Precipitate of Uranium Phosphate and the Supernatant Generated in Step 3 by Solid-Liquid Separation Solid-liquid separation was performed by using a filter press equipped with a fibrous separation membrane (250 mm×250 mm) made of polypropylene capable of filtering particles in the size of 0.5 to 1 μm.

Step 7: Mixing the Undissolved Solid Materials Separated in Step 2 with the Precipitate of Uranium Phosphate Separated in Step 6 and then Adding a Glassification Agent Thereto, Followed by Heat-Treatment to Fix the Mixture in the Form of a Glass-Ceramic Composite Medium The undissolved solid separated by the solid-liquid separation in step 2 and the uranium phosphate precipitate separated in step 6 were basically particulate materials, indicating immobilization was required for final disposal.

To do so, a method of making these mixed materials into a stable glass-ceramic medium was used in the present invention. As explained hereinbefore, the solid material obtained in step 2 contained a portion of the undissolved $SiO_2$ support, mostly undissolved $Sb_2O_5$, $Fe_2O_3$, and $U_3O_8$, and $SiO_2$, the filter-aid used for the solid-liquid separation.

The solid obtained from the step 6 was $MUO_2PO_4$ (M=Na, K) and the volume was less than 1%, which was relatively smaller than that of the undissolved solid material generated in step 2.

For the experiment of solidification of the final target solid waste, the solids of step 2 and step 6 were mixed together, to which $Na_2O$ or $B_2O_3$, the glassification agent, was added at the ratio of about 1:7 to $SiO_2$. This mixture was put into a mold having a diameter of 13 mm and pressed at 20 MPa to prepare a green body, which was sintered at 1,100° C. for 4 hours.

For the comparison, a sintered body was prepared by compression molding by the same manner as described above except that no glassification agent was added thereto. The compressive strength, sintered volume reduction, final volume reduction and uranium leaching rate of the final sintered body were evaluated and the results are shown in Table 3 below. The leaching rate was calculated using the PCT (Product Consistency Test: ASTM-C1285) evaluation method. The prepared sintered body was pulverized and the particles passing through a 200-mesh filter were added to water at the ratio of 1 g:10 mL, followed by leaching at 90° C. for 7 days. Then, the uranium concentration in the solution was analyzed and calculated by the following mathematical formula.

LR (Leaching rate (g/m² day)=$C_i/(f_i \cdot SA \cdot t)$ $C_i$: concentration of uranium ions measured in the solution (g/L);

$f_i$: uranium fraction in the sample before leaching; and

SA: specific surface area of the sample (herein 29.9 m²/L)

Table 3 presents the physical properties of the solid to be disposed.

TABLE 3

|  | Compressive strength (MPa) | Volume reduction by heat-treatment (%) | Volume reduction from the initial waste (%) | Leaching rate (g/m² · day) |
|---|---|---|---|---|
| Without glass flux | 14.31 | 11.22 | 67.17 | 1.418 × 10⁻³ |
| Na₂O | 29.31 | 19.89 | 60.15 | 1.085 × 10⁻³ |
| B₂O₃ | 65.28 | 50.05 | 81.33 | 1.063 × 10⁻³ |

The compressive strength of the prepared sintered body exceeded 3.44 MPa (500 psia), which is the compressive strength required for solidified waste to be disposal in South Korea. When a glassification agent (glass flux) was added to the target solid, the compressive strength was greatly increased. When $B_2O_3$ was added thereto, the highest compressive strength was observed. The volume reduction yield after the sintering of the green body was increased as the glassification agent was added, and at this time, when $B_2O_3$ was added the volume reduction rate was the best.

The final volume reduction yield calculated from the tap density of the spent uranium catalyst and the apparent density of the sintered body was more than 60%. When $B_2O_3$ was used, the yield was increased to 80%. When a glassification agent was added, the undissolved uranium oxide was combined and encapsulated with the vitrified materials, resulting in the reduction of the leaching rate (improvement). The leaching rate herein, $1.0 \times 10^{-3}$ g/m²·day, is the value of about leaching index 10 or more above leaching index 7, which is the Korean domestic disposal facility waste acceptance criteria evaluated according to ANS 16.1 method The volume reduction treatment method of a spent uranium catalyst of the present invention accomplished by step 1 through step 7 above can reduce the volume of the spent uranium catalyst, the treatment target, by 60 to 80% by making it in the form of a stabilized solid and the silicon dioxide and effluent generated in the course can be discharged without any problem since they satisfy the clearance criteria and discharge standard.

Therefore, it was confirmed that the method of the present invention is simplified and efficient, compared with the conventional method, in treating a spent uranium catalyst.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

What is claimed is:

1. A treatment method of a spent uranium catalyst, wherein said spent uranium catalyst comprises a support component, said method comprising the following steps:
    selectively dissolving the support component by immersing the spent uranium catalyst in an alkali solution (step 1), thereby generating a dissolution solution and undissolved solid materials;
    separating the dissolution solution and the undissolved solid materials in the step 1 by solid-liquid separation (step 2);
    selectively precipitating the silicon ions in the dissolution solution as silicon dioxide (step 3);
    separating the silicon dioxide generated in step 3 by solid-liquid separation and purification (step 4), thereby generating a residual solution;
    precipitating uranium ions as uranium phosphate by adding phosphate to the residual solution separated in step 4 (step 5);
    separating the uranium phosphate generated in step 5 by solid-liquid separation (step 6);
    mixing the undissolved solid materials separated in step 2 with the precipitate of uranium phosphate separated in step 6 and then adding a glassification agent thereto thereby generating a mixture, followed by heat-treatment to fix the mixture in the form of a glass-ceramic composite medium (step 7).

2. The treatment method of a spent uranium catalyst according to claim 1, wherein the spent uranium catalyst of step 1 has a form in which $U_wSb_xM_yO_z$ is supported on a silicon dioxide support, wherein M is one or more materials selected from the group consisting of Fe, Al, Mo, V, and Bi; and w, x, y, and z indicate the molar ratio of the elements constituting the oxide.

3. The treatment method of a spent uranium catalyst according to claim 1, wherein the alkali solution of step 1 is one or more solutions selected from the group consisting of sodium hydroxide solution, potassium hydroxide solution, lithium hydroxide solution, and ammonium hydroxide solution.

4. The treatment method of a spent uranium catalyst according to claim 1, wherein the molar concentration of hydroxide ions in the alkali solution of step 1 is 2 to 4 M.

5. The treatment method of a spent uranium catalyst according to claim 1, wherein the dissolution of step 1 is induced at the boiling point of the solution.

6. The treatment method of a spent uranium catalyst according to claim 1, further comprising an additional step of heat-treating the spent uranium catalyst at 550 to 750° C. before the dissolution process is accomplished in step 1.

7. The treatment method of a spent uranium catalyst according to claim 1, wherein when the spent uranium catalyst is dissolved in the alkali solution in step 1, the ratio of the volume (mL) of the alkali solution to the weight (g) of the spent uranium catalyst is 0.125 to 0.25 g/mL.

8. The treatment method of a spent uranium catalyst according to claim 1, wherein the solid-liquid separation in step 2 is performed by using a separation membrane coated with diatomite powder.

9. The treatment method of a spent uranium catalyst according to claim 8, wherein the separation membrane is coated with diatomite powder at the thickness of 1 to 2 mm.

10. The treatment method of a spent uranium catalyst according to claim 8, wherein the separation membrane is appropriate for filtering the particles in the mean diameter of 0.5 to 1 μm.

11. The treatment method of a spent uranium catalyst according to claim 8, wherein the diatomite has an average diameter of 30 to 38 μm.

12. The treatment method of a spent uranium catalyst according to claim 1, further comprising an additional step of converting uranium into complex ions by adding hydrogen peroxide and phosphate to the dissolution solution separated by solid-liquid separation before the selective precipitation of the silicon ions remaining in the dissolution solution in step 3.

13. The treatment method of a spent uranium catalyst according to claim 12, wherein the uranium complex ions are in the form of $UO_2(O_2)(CO_3)_2^{4-}$.

14. The treatment method of a spent uranium catalyst according to claim 1, wherein the selective precipitation of silicon ions in step 3 is accomplished by adjusting the pH of the dissolution solution separated by solid-liquid separation to 9 to 10.

15. The treatment method of a spent uranium catalyst according to claim 1, wherein the solid-liquid separation is performed by using a media filtration method.

16. The treatment method of a spent uranium catalyst according to claim 1, wherein the phosphate of step 5 is $NaH_2PO_4$, $KH_2PO_4$, or $NH_4H_2PO_4$.

17. The treatment method of a spent uranium catalyst according to claim 1, wherein the precipitation of uranium ions in the form of uranium phosphate in step 5 is performed after adding phosphate to the solution remaining after the solid-liquid separation in the step 4 at the concentration of 0.1 to 6 mM, during which the pH is adjusted to 5 to 7.

18. The treatment method of a spent uranium catalyst according to claim 1, wherein the glassification agent of step 7 is $NaO_2$ or $B_2O_3$.

19. The treatment method of a spent uranium catalyst according to claim 1, wherein the glassification agent of step 7 is added at the concentration of 5 to 15 weight % by the total silicon oxide weight of mixture of the undissolved solid separated in step 2 and the uranium phosphate precipitate separated in step 6.

20. The treatment method of a spent uranium catalyst according to claim 1, wherein the temperature for the heat-treatment of step 7 is 700 to 1200° C.

21. The treatment method of a spent uranium catalyst according to claim 1, further comprising an additional step of washing the precipitate separated in step 4 by passing acid and water through the precipitate.

* * * * *